Dec. 4, 1962  R. F. LAWDERMILT  3,067,015
SPOILAGE INDICATOR FOR FOOD CONTAINERS
Filed Jan. 29, 1960  3 Sheets-Sheet 1
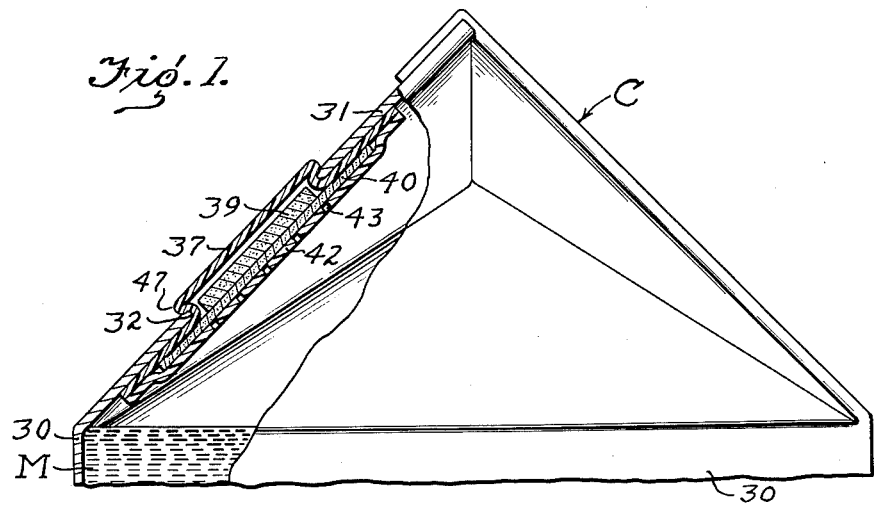
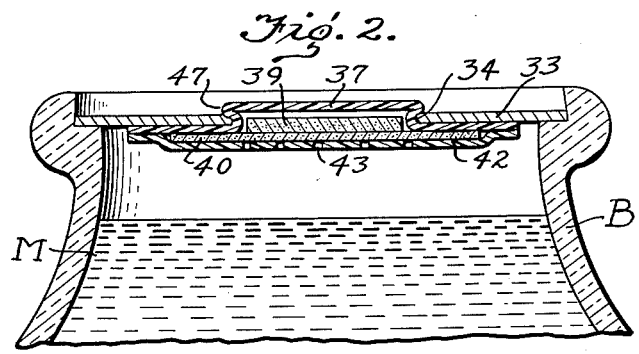
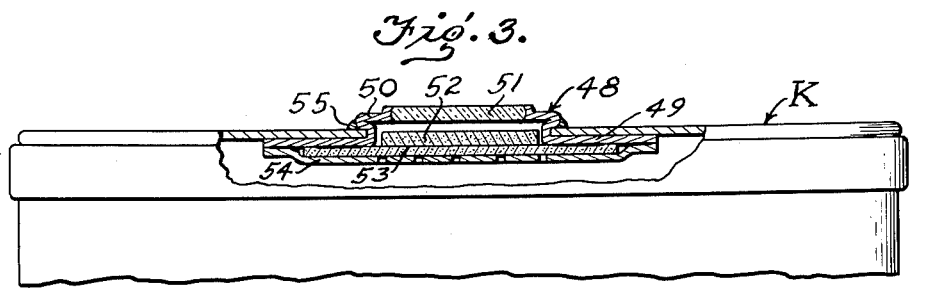
INVENTOR
R. F. Lawdermilt
BY Lowry & Rinehart
ATTORNEYS Dec. 4, 1962 R. F. LAWDERMILT 3,067,015
SPOILAGE INDICATOR FOR FOOD CONTAINERS
Filed Jan. 29, 1960 3 Sheets-Sheet 2
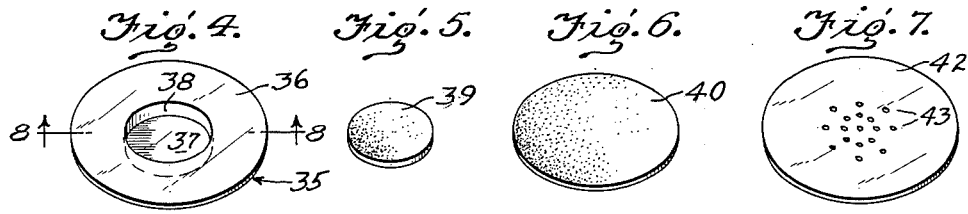
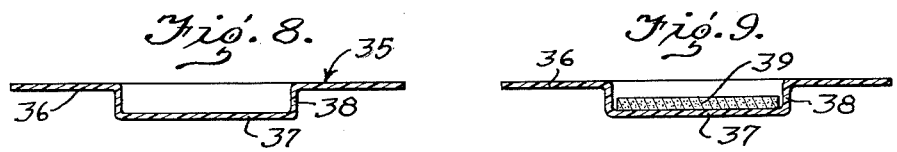
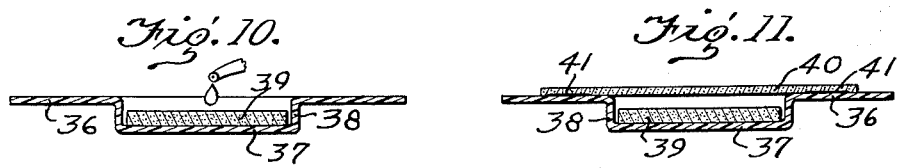
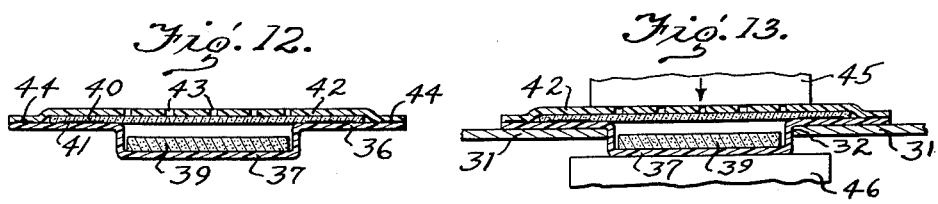
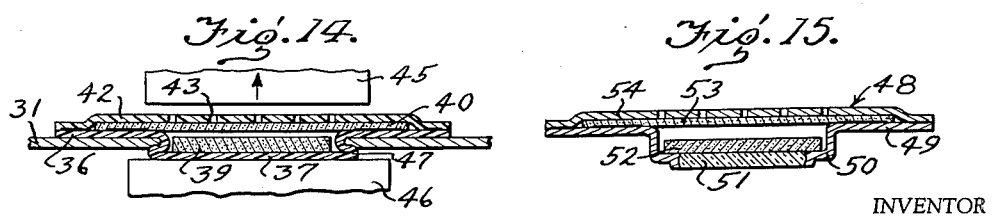
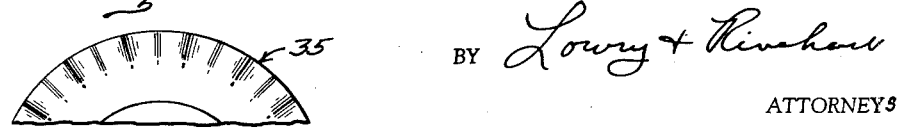
INVENTOR
R. F. Lawdermilt
BY Lowry + Rinehart
ATTORNEYS Dec. 4, 1962  R. F. LAWDERMILT  3,067,015
SPOILAGE INDICATOR FOR FOOD CONTAINERS
Filed Jan. 29, 1960  3 Sheets-Sheet 3

INVENTOR
R. F. Lawdermilt
BY Lowry & Rinehart
ATTORNEYS

United States Patent Office 3,067,015
Patented Dec. 4, 1962

3,067,015
SPOILAGE INDICATOR FOR FOOD
CONTAINERS
Ray F. Lawdermilt, 225 Lincoln Ave., North Vernon, Ind.
Filed Jan. 29, 1960, Ser. No. 5,473
14 Claims. (Cl. 23—253)

This invention relates to spoilage indicators for food containers, and more particularly to spoilage indicators for milk cartons, although, with suitable modifications, the indicator may be applied to various types of food containers.

In the dairy industry there has been considerable controversy as to what sanitary significance can be attached to the presence of large numbers of bacteria in milk. Many of the species which multiply most rapidly in milk are entirely harmless, and, in fact, certain fermented milks which contain enormous numbers of lactic acid bacteria are believed by many to be particularly wholesome, such as buttermilk, sour cream and the like. On the other hand, it has been established by research that only as a result of insanitary methods or insufficient safeguards in the handling of milk can the large numbers of bacteria sometimes found in market milk be accounted for. It has become the accepted practice that, in general, the presence of large numbers of bacteria reflects serious doubt upon the sanitary quality and wholesomeness of milk. The National Commission on Milk Standards, for example, specify that for raw milk the bacteria count shall not exceed 10,000 per cubic centimeter at the time of delivery to the consumer. For pasteurized milk, the count shall not exceed 200,000 per cubic centimeter in the raw stage, which is reduced to 10,000 per cubic centimeter at the time of delivery to the customer.

The following resolutions have been adopted by the National Commission on Milk Standards:

"Whereas, milk is one of the most perishable foods, being extremely susceptible to contamination and decomposition; whereas the milk consumer is justified in demanding that milk should be clean, fresh, and cold, in addition to having the element of safety; whereas milk which is from healthy cows and is clean, fresh, and which has been kept cold will always have a low bacterial count; whereas milk that is dirty, stale, or has been left warm, will have a high bacterial count, therefore it is resolved:

"First: That the health officer is justified in using the bacterial count as an indicator of the degree of care exercised by the producer and dealer in securing milk from healthy cows and in keeping the same clean, fresh, and cold.

"Second: That the health officer is justified in condemning milk with a high bacterial count as being either unhealthy or decomposed, or containing dirt, filth, or decomposed material as a result of the multiplication of bacteria due to age and temperature.

"Third: That the health officer is justified in ruling that large numbers of bacteria are a source of possible danger, and that milk containing large numbers of bacteria is to be classed as unwholesome, unless it can be shown that the bacteria present are of a harmless type, as for example, the lactic acid bacteria in buttermilk, or other especially soured milks."

In the dairy industry, various local controlling authorities have imposed rather stringent controls on dairy farmers and collecting and processing plants, and regular tests, including bacterial counts, are run on the milk at various stages in the bulk processing. These are on such a scale that large and complex equipment is customary and practical. However, under present conditions of distribution, when the milk has been bottled, tests are no longer made. If the milk is stored for an unduly long period of time or has not been kept at a constant low degree of temperature, spoilage or bacteria multiplication may occur, and the consumer has unsafe or spoiled milk on his hands. The retailer has no way of assuring himself that he is sending safe, fresh milk to his customers. From the standpoint of the public authorities, this is an area over which there is no adequate control.

In milk in which an undue amount of bacterial multiplication has occurred, and wherein the milk has passed below the minimum quality for human consumption, it has been found that one of the products generated is carbon dioxide. Carbon dioxide, upon contact with moisture, forms the hypothetical acid, carbonic acid. The acid is unstable but will react with potassium hydroxide, or similar bases, and this is measurable. Therefore, milk in a container, which has spoiled, has above the liquid body a substantial excess of carbon dioxide. Tests indicate that milk at the point of spoilage, which has ceased to be fit for human consumption, has a pH of 5.9. In its fresh state, milk has a pH of 6.5 to 6.6.

There is urgent need, therefore, for an indicator for spoilage of milk which will inform the consumer, retailer or the public authorities, without complex tests, the condition of a container of milk. This indicator must be low in cost and practical to apply. Further, the indicator itself must not contaminate the product in any way, and there must be no harmful effect on taste, color or container sealing.

It is an object of the invention to provide a spoilage indicator which may be placed on each milk or food container, and which will indicate at a glance whether the product in the container is fit for human consumption.

Another object of the invention is to provide an indicator for food containers wherein a simple color change will signal that milk or food in the container is no longer fresh, and is probably spoiled.

A further object of the invention is to provide an indicator which is cheap and economical to make, which may be manufactured and distributed as a finished capsule, and which may be applied to milk or food containers in a simple operation either by hand or by machine.

Still another object of the invention is to provide a chemical spoilage indicator which will meet all sanitary standards of the public health authorities, which will not affect the milk or food as to taste, color and purity, and in which the indicator material is not in direct contact with the milk or food product.

With the above and other objects in view, as will be presently apparent, the invention consists in general of certain novel details of construction and combinations of parts hereinafter fully described, illustrated in the accompanying drawings, and particularly claimed.

In the accompanying drawings, like characters of reference indicate like parts in the several views, and FIGURE 1 is a fragmentary side elevation, partly broken away, showing the spoilage indicator of the invention mounted in the upper top panel of a milk carton;

FIGURE 2 is a fragmentary cross-sectional view of the spoilage indicator as mounted in a cap or top of a standard milk bottle;

FIGURE 3 is a fragmentary view, partly broken away, of a modification of the spoilage indicator, as applied to metallic food containers;

FIGURE 4 is an isometric view of the plastic hat which forms one element of the first form of the invention;

FIGURE 5 is an isometric view of the absorbent indicator disc of the first form of the invention;

FIGURE 6 is an isometric view of the diffusion disc of the first form of the invention;

FIGURE 7 is an isometric view of the rear protective plate of the first form of the invention;

FIGURES 8 through 12 show the successive steps involved in making the first form of the invention;

FIGURES 13 and 14 show the manner of fixing the spoilage indicator to a food carton;

FIGURE 15 is a cross-sectional view of a modified form adapted for mounting on a metallic container;

FIGURE 16 is a fragmentary view of the hat of FIGURE 4, showing the manner in which the edges may be crimped, if desired, when forming the hat, to take up excess material.

Figure 17:
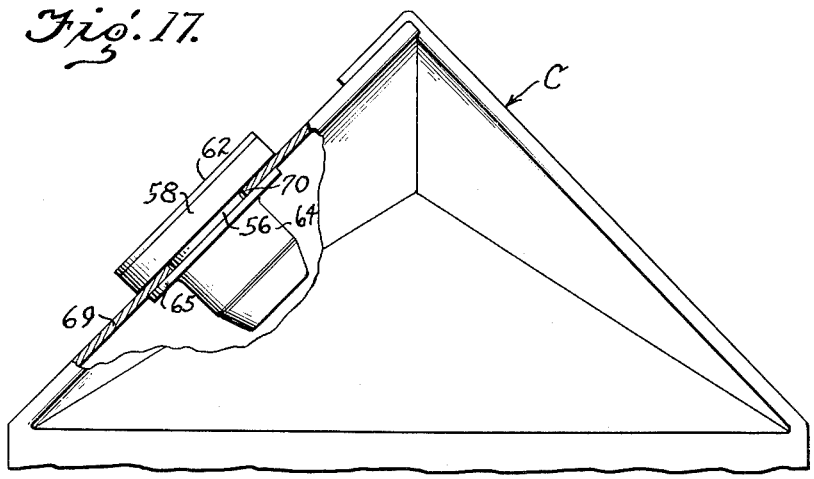

In the drawings, FIGURES 1 and 2 show one form of the invention as applied to two different types of milk containers. In FIGURE 1, the carton C represents a standard, folded blank, wax impregnated milk carton. When closed and sealed, as shown in FIGURE 1, the carton contains milk up to approximately the top of the side wall panel. The peak or roof then forms an air space above the fluid level. The indicator capsule of the present invention is set into a circular aperture 32 formed in the roof panel 31 of the carton. In FIGURE 2, the indicator capsule is shown applied to a standard glass bottle B provided with disc cap 33. The indicator is mounted in a circular aperture 34 cut into the disc cap. It will be noted that normally the fluid level of the milk M is kept slightly below the top of the bottle B. In a similar manner, the indicator could be mounted in the standard crimped cap of a milk bottle.

The specific details of the indicator capsule and the manner of making the same are best shown in FIGURES 4 through 14 of the drawings. The main part of the indicator is a circular plastic element 35 called a "hat." This hat comprises a circular flange and a crown 37. When formed, this crown has straight side walls 38. In the crown is placed the indicator disc 39 of soft absorbent material. Certain chemicals are applied which render the disc capable of indicating spoilage. These will be discussed more in detail in a succeeding part of this disclosure.

As shown in FIGURE 11, a diffusion disc 40 of porous parchment paper is placed upon the flange 36 of the hat. This disc, preferably smaller than the hat, must be capable of gas porosity but must retain excellent wet strength after intimate contact with water and be impermeable to water or other larger molecules.

One suitable paper for this disc was found to be a parchment paper identified in the trade as Patapar 27–81T. In a test for water retention or impermeability, this paper was draped over glass and water placed in the pocket so formed. After a period of two weeks, water had not passed through the parchment into the glass. In actual tests in an asembled unit, this paper demonstrated excellent ability to pass gas molecules by diffusion. If desired, a suitable nontoxic thermosetting cement 41 can be placed between the disc 40 and flange 36 in order to provide an absolute water seal.

A protective backing 42 of plastic is then placed over the disc 40 and is larger than said disc. The backing is provided with perforations 43 so that the spoilage gas will have access to the diffusion disc. This protective backing is sealed to the flange 36 of the hat by an adhesive 44 or by any known heat sealing method for plastics.

As thus formed, the capsule is complete and ready for application to the container. As shown in FIGURES 13 and 14, the crown 37 of the hat 35 is placed through the aperture 32 in the panel 31, which aperture is the same size as the crown. The carton and unit are then placed between the press jaws 45 and 46 which are suitably heated. Pressure forces the softened plastic crown down to form a bead 47. This bead, when heat and pressure are removed, hardens and clamps tightly the peripheral edge of the aperture 32. This holds the indicator capsule in place and also makes a proper seal so as to maintain the carton liquid proof and dirt proof.

A modification is shown in FIGURES 3 and 15, wherein the capsule may be applied to metallic containers. The unit 48 is made of light metal having flange 49 and crown 50. A synthetic plastic or glass window 51 is set into the crown. The unit contains the absorbent disc insert 52 and the diffusion disc 53. A perforated protective backing 54 is soldered to the flange 49. The unit 48 may be applied to the can K in the same manner as shown for the plastic unit in FIGURES 13 and 14, and if a tighter seal is desired, solder 55 may be app'ied. If desired, the pressure step may be eliminated and the undeformed crown soldered or brazed to the can.

Figure 18:
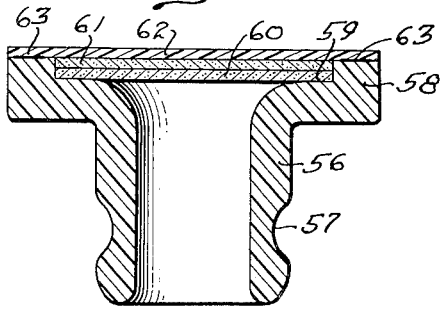
Figure 20:
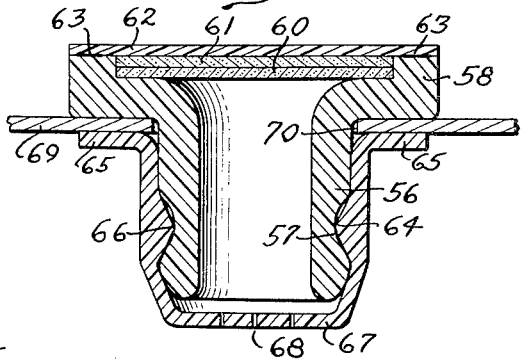
Figure 19:
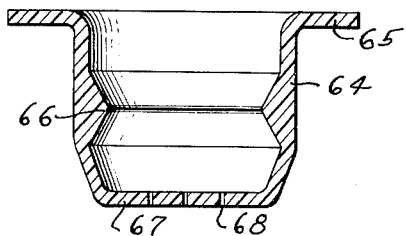

A modification of the invention is found in FIGURES 17 through 20. In this form, the application of the capsule in a dairy or food processing plant is simpler, requiring less complicated machinery. The basic part of the capsule is a stud 56 which has an annular groove 57 adjacent the inner end. This stud also has a flange 58, the flange being recessed to define an annular shoulder 59.

On the shoulder 59 is placed the diffusion disc 60 of parchment paper. Overlying the diffusion disc is an absorbent pad 61 for the indicator chemical. An outer window 62 is fastened to the flange 58 by cement 63 or by heat sealing means.

For cooperating with the stud 56 is a cup 64. This cup has an outwardly turned flange 65 and an inwardly directed annular rib. The end wall 67 of the cup has perforations 68. When assembled, the stud 56 is inserted through an aperture 70 in the panel 69. The cup 64 is placed over the stud and the two pushed together. The rib 66 snaps into the groove 57 and the flanges 65 and 58 grip the edge of the carton aperture. The resilience of the synthetic plastic material, which is preferably used, causes the panel 69 to be tightly gripped.

INDICATOR DISC

The indicator disc, as pointed out above, is of porous paper. One type of paper found to be successful is No. 4 Whatman filter paper. A weak solution of an alkaline material, such as potassium hydroxide, calcium hydroxide, ammonium hydroxide or sodium hydroxide, is made and in this is placed a suitable quantity of an indicator dye. These quantities and concentrations are adjusted so that the indicator turning point occurs approximately at the souring point of milk. When basic, the indicator dye is preferably colorless. The disc is saturated to wetness with the solution, and such disc is then sealed in the capsule.

Various indicator dyes may be used. Twelve indicators having a pH range of 11.0 to 14.0 were tested. These were: alizarin blue S, alkali blue, anilin blue WS, clayton yellow, alkali orange, alkali purple, fuchsine acid, indigo carmine, malachite green, methyl blue, orange G and poirrier blue. Of those tested, fuchsine acid provided the sharpest contrast in changing from basic to acidic, and moved quickly into solution.

Tests with milk samples have been made, and two tests are reported as follows:

*Test No. 1*

Four indicator packets were made according to the following. Fuchsine acid changes at a pH of about 12, so an 0.2 N KOH solution was used as a starting point.

| Sample No. | Base and (or) acid | Amount Fuchsine Acid |
|---|---|---|
| 1 | 4* drops KOH (.206 N.) | 48 mg. fuchsine acid. |
| 2 | 3 drops KOH (.206 N.) | 50 mg. fuchsine acid. |
| 3 | {4 drops KOH / 1 drop 0.106 N HCl} | 46 mg. fuchsine acid. |
| 4 | {4 drops KOH / 2 drops HCl} | 54 mg. fuchsine acid. |

* To zero pt. on micro-burette.

*Results.*—Nos. 2, 3 and 4 changed at approximately the same time. No. 1 changed about one hour later. All changed very close to milk souring point which could only be approximated by taste and smell. First occuring change color was from colorless to pink and then to red. Pink color was present for about one-half hour. No. 1 appeared to be closest to souring point.

It should be pointed out that each ¾" disc contained approximately one drop of indicator solution. Therefore, each disc contained 10–12 mg. fuchsine acid.

Test No. 2

To check uniformity of Test No. 1, a second test was set up. In this test, four samples were also run on half pint bottles.

(1) 4 drops 0.206 N KOH, 48 mg. fuchsine acid
(2) 4 drops N KOH, 51 mg. fuchsine acid
(3) 4 drops N KOH, 1 drop .106 N HCl, 53 mg. fuchsine acid
(4) Same as No. 3, 49 mg. fuchsine acid

*Results.*—All four of these changed quite near to souring point. No. 4 changed quickest of all but was very close to 1, 2 and 3.

Tests No. 1 and 2 indicate that 0.206 N KOH-fuchsine is very close to the correct concentration.

OPERATION

All modifications of the indicator work in substantially the same manner. The indicator unit is positioned above the contents level. If spoilage occurs, as in the case of milk, carbon dioxide is formed. This gas occupies the air space above the fluid and the small light molecules of the gas move through the perforations and work by diffusion through the diffusion disc 40. The $CO_2$ is absorbed by the wet indicator disc and carbonic acid is formed. This is unstable, but it will change the indicator dye from base to acid to effect a color change from colorless to pink to red. The color change, viewed through the crown 37, indicates spoilage. Water in the milk or food cannot pass through the diffusion disc, nor can the large dye molecules or the potassium hydroxide, or other base, work back through said diffusion disc to contaminate the carton contents.

The indicator capsule can be easily applied to any standard carton or cap, as a preassembled unit.

While there is herein shown and described the preferred embodiment of the invention, it is nevertheless to be understood that minor changes may be made therein without departing from the spirit and scope of the invention as claimed.

What is claimed is:

1. The combination with a walled food container of a spoilage indicator including a transparent window mounted in a wall of said container, an indicator element positioned in said container behind said window, a diffusion sheet behind said indicator element, said diffusion sheet being unidirectionally permeable to gases but impermeable to liquids and solids, said diffusion sheet further being attached to said window along its marginal edges, whereby said indicator element is sealed between said sheet and said window, said indicator element including a color changing chemical substance reactive to gases in said container resulting from the spoilage of food in said container, whereby said substance when spoilage occurs undergoes a color change observable through said window.

2. The combination with a walled food container of a spoilage indicator including a transparent window mounted in a wall of said container, an indicator element positioned in said container behind said window, a diffusion sheet behind said indicator element, said diffusion sheet being unidirectionally permeable to gases but impermeable to liquids and solids, said diffusion sheet further being attached to said window along its marginal edges, whereby said indicator element is sealed between said sheet and said window, said indicator element including a solution of an alkaline material and an acid-reacting indicator dye and being reactive to gases in the container resulting from the spoilage of food therein, whereby a color change is produced which is observable through said window.

3. The combination with a walled food container of a spoilage indicator including a transparent window mounted in a wall of said container, an absorbent indicator mass positioned in said container behind said window, a diffusion sheet behind said indicator mass, said diffusion sheet being unidirectionally permeable to gases but impermeable to liquids and solids, said diffusion sheet further being attached to said window at its marginal edges whereby said indicator mass is sealed between said sheet and said window, said indicator mass having a color changing chemical substance absorbed therein reactive to gases in said container resulting from the spoilage of food in said container, whereby said substance when spoilage occurs undergoes a color change observable through said window.

4. The combination of claim 1 wherein said spoilage indicator further includes a perforated protective sheet behind and covering said diffusion sheet wherein said sheet is protected against damage from the fluid contents of the container.

5. The combination with a walled food container of a spoilage indicator capsule, said capsule including a cup-shaped window projecting through an opening in a wall of said container, said cup-shaped window being pressed down to form an annular bead gripping the marginal edge of said opening, an indicator element positioned in said container behind said window, a diffusion sheet behind said indicator element, said diffusion sheet being unidirectionally permeable to gases but impermeable to liquids and solids, said diffusion sheet further being attached to said window at its marginal edges whereby said indicator element is sealed between said sheet and said window, said indicator element including a color-changing chemical substance reactive to gases in said container resulting from the spoilage of food in said container, whereby said substance when spoilage occurs undergoes a color change observable through said window.

6. The combination of claim 5 wherein said spoilage indicator capsule further includes a perforated protective sheet behind and covering said diffusion sheet wherein said sheet is protected against damage from the fluid contents of the container.

7. A spoilage indicator capsule for food containers, including a cup-shaped window having an outwardly directed marginal flange, an indicator element in said cup-shaped window, a diffusion sheet covering the open end of said cup and secured to said flange, said diffusion sheet being unidirectionally permeable to gases but impermeable to liquids and solids, and a perforated protective sheet covering said diffusion sheet.

8. A spoilage indicator capsule for food containers including a cup-shaped window having an outwardly directed marginal flange, an indicator element in said cup-shaped window, a diffusion sheet covering the open end of said cup and secured to said flange, said diffusion sheet being unidirectionally permeable to gases but impermeable to liquids and solids, said sheet being smaller than said cup-shaped window, and a perforated protective sheet and covering said diffusion sheet having its marginal edges secured to said flange.

9. A spoilage indicator capsule for food containers including a cup-shaped window having an outwardly directed marginal flange, an absorbent indicator element in said cup-shaped window, said element being wetted with a solution of an alkaline material and an acid-reacting indicator dye, a diffusion sheet covering the open end of said cup and secured to said flange, said diffusion sheet being unidirectionally permeable to gases but impermeable to liquids and solids, and a perforated protective sheet covering the diffusion sheet.

10. A spoilage indicator capsule for food containers including a hollow stud, a flange on the outer end of said stud defining an inwardly directed annular shoulder, a recess in the outer face of said flange defining an outwardly directed annular shoulder, a diffusion sheet on said shoulder, said diffusion sheet being unidirectionally permeable to gases but impermeable to liquids and solids, a color changing indicator element outwardly of said diffusion sheet, a window covering said indicator element, said window being secured to said flange, and a perforated, cup-shaped cap member receiving the inner end of said stud.

11. A spoilage indicator as set forth in claim 10, wherein said cap member and said stud member have interlocking rib means for securing them in assembled position.

12. A spoilage indicator capsule for food containers including a frame, a color changing indicator element mounted on said frame, said element being sealed between an outer transparent window and an inner diffusion sheet, said diffusion sheet being unidirectionally permeable to gases but impermeable to liquids and solids, a hollow stud projecting from said frame, the bore of said stud leading to said diffusion sheet, and a cup-shaped clamping member tightly receiving said stud.

13. The combination with a walled food container of a spoilage indicator capsule, said capsule including a frame positioned over an opening in said container, a color-changing indicator element mounted on said frame, said element being sealed between an outer transparent window and an inner diffusion sheet, said diffusion sheet being unidirectionally permeable to gases but impermeable to liquids and solids, a hollow stud projecting from said frame, the bore of said stud leading to said diffusion sheet, and a clamping ring tightly received by said stud, said frame and said ring forming opposed jaws clamping the marginal edge of the opening in said container.

14. A spoilage indicator capsule for food containers, including a transparent facing, a color changing spoilage indicator element positioned behind and adjacent said facing, a diffusion sheet covering said indicator element in opposed relation to said facing and having its marginal edges in tightly sealed relationship with said transparent facing, said diffusion sheet being unidirectionally permeable to gases but impermeable to liquids and solids.

References Cited in the file of this patent

UNITED STATES PATENTS

| | | |
|---|---|---|
| 2,567,445 | Parker | Sept. 11, 1951 |
| 2,785,057 | Schwab | Mar. 12, 1957 |
| 3,000,706 | Royce | Sept. 19, 1961 |

FOREIGN PATENTS

| | | |
|---|---|---|
| 631,482 | Great Britain | Nov. 3, 1949 |